UNITED STATES PATENT OFFICE.

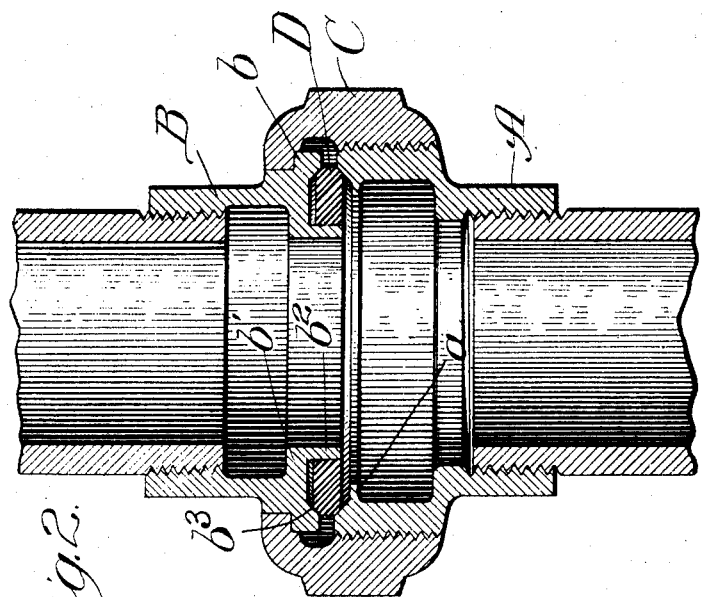
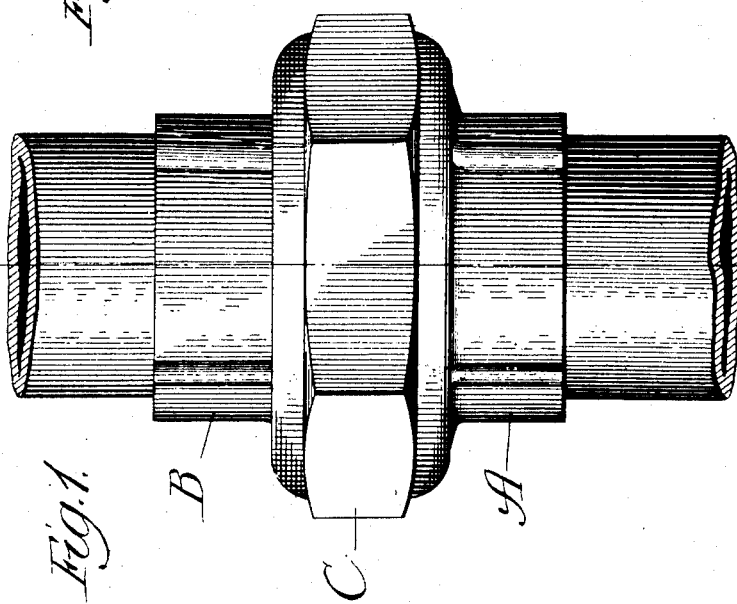

ANTON G. ANDERSON, OF CHICAGO, ILLINOIS, ASSIGNOR TO ILLINOIS MALLEABLE IRON COMPANY, OF CHICAGO, ILLINOIS, A CORPORATION OF ILLINOIS.

PIPE-UNION.

No. 883,075.  Specification of Letters Patent.  Patented March 24, 1908.

Application filed August 9, 1907. Serial No. 387,796.

*To all whom it may concern:*

Be it known that I, ANTON G. ANDERSON, a citizen of the United States, residing at Chicago, in the county of Cook and State of Illinois, have invented a new and useful Improvement in Pipe-Unions, of which the following is a specification.

My invention relates to certain new and useful improvements in pipe unions and is fully described and explained in the specification and shown in the accompanying drawing, in which:

Figure 1 is an elevation of my improved union, and Fig. 2 is a longitudinal section in the line 2 of Fig. 1.

Referring to the drawings, A is the spud of my improved pipe-coupling or union, the same being internally screw-threaded at one end and externally screw-threaded at the other, as is common practice. The spud A has at its externally screw-threaded end an internally-projecting annular bead $a$ the outer surface of which is given a conical form, as illustrated.

B indicates the tail-piece of my improved pipe-coupling or union, the same being internally screw-threaded at one end in the usual way and having at its opposite end a shoulder $b$ adapted to engage with a ring or nut C. The nut C is internally threaded at its opposite end to engage the external threads upon the spud A.

The tail-piece B has at its lower end an inwardly-extending web $b^1$ at the inner edge of which is a cylindrical flange $b^2$ concentric with the axis of said tail-piece. The web $b^1$ also has near its outer margin a shoulder $b^3$ the inner surface of which is conical in form, so that between said shoulder and the flange $b^2$ is formed an annular channel the inner surface of which is cylindrical and the outer surface of which is conical. In practice the spud, nut and tail-piece will all be constructed of iron in the usual way. A ring D, preferably of brass, is inserted in the annular channel formed between the shoulder $b^3$ and the flange $b^2$, the said ring having its two outer edges beveled off to form short conical surfaces of the same inclination as the surfaces upon the shoulder $b^3$ and upon the flange $a$ upon the spud. The ring is of such size as to engage only said two conical surfaces and the flange $b^2$ and not to rest against the transverse web $b^1$, whereby two tight ground joints are secured. The ring is also necessarily of such size as to keep the spud and tail-piece normally separated so that there is a small annular space within the nut C and between the said spud and tail-piece.

By the above construction a union is secured which is exceedingly efficient as far as tightness, which is the first prime requisite of a union, is concerned. It can also be constructed very cheaply, the principal parts involving weight being all of iron. The use of the brass ring renders the union non-corrodible in character, so that the parts can readily be separated even after many years of use, and the particular construction and arrangement shown and described is such that the brass ring can be used for this purpose without in any way affecting the tightness of the union.

I realize that considerable variation is possible in the details of this construction without departing from the spirit of my invention, and I do not intend, therefore, to limit myself to the specific form herein shown and described.

I claim as new, and desire to secure by Letters Patent:

1. The combination with an iron nut, spud and tail-piece, the spud and tail-piece having conical seats opposed to each other, of a brass ring tapered at its outer edges only to provide bearing surfaces to fit said conical seats and held in place between said spud and tail-piece.

2. The combination with an iron spud, nut and tail-piece, the spud having a conical seat and the tail-piece having an annular channel opposed thereto, one side of which is conical, of a brass ring in the channel of the tail-piece and said ring being tapered at its outer edges only to provide bearing surfaces to fit said conical surfaces.

3. The combination with an iron spud having a conical seat and an iron tail-piece having a transversely-extending web with a cylindrical flange at its inner margin and a shoulder presenting a conical surface opposed to the conical seat upon the spud, of an iron nut holding the spud and tail-piece together, and a brass ring held by the shoulder and flange of the tail-piece out of contact with the web and pressed against the conical seat on the spud.

4. The combination with an iron tail-piece having a transverse web flanged at its inner margin and channeled outside of said flange, said channel having a conical outer margin, of an iron spud having a conical surface opposed to said conical surface, an iron nut holding the spud and tail-piece together, and a brass ring lying within said channel and having surfaces to conform to the conical seat on the spud and the conical surface of the channel of the tail-piece the ring being held by the flange and the outer conical margin of the channel out of contact with the bottom of the channel.

ANTON G. ANDERSON.

In presence of—
  J. H. LANDES,
  R. A. SCHAEFER.